United States Patent [19]
Nakane et al.

[11] Patent Number: 4,994,543
[45] Date of Patent: Feb. 19, 1991

[54] HALOGENATED POLYESTER RESIN COMPOSITION AND ELECTRIC WIRE

[75] Inventors: Toshio Nakane; Yukihiko Kageyama; Hiroaki Konuma; Kenji Hijikata, all of Shizuoka, Japan

[73] Assignee: Polyplastics Co., Ltd., Osaka, Japan

[21] Appl. No.: 377,053

[22] Filed: Jul. 10, 1989

[30] Foreign Application Priority Data

Aug. 31, 1988 [JP] Japan ................................ 63-217597

[51] Int. Cl.$^5$ ............................................ C08G 18/42
[52] U.S. Cl. ...................................... 528/83; 528/85; 428/425.8
[58] Field of Search ................ 528/83, 85; 428/425.8

[56] References Cited

U.S. PATENT DOCUMENTS 3,719,639  3/1973  Reetz et al. ........................ 528/83

Primary Examiner—Maurice J. Welsh
Attorney, Agent, or Firm—Birch, Stewart, Kolasch & Birch

[57] ABSTRACT

A halogenated polyester resin composition is useful as coating for an electric wire and comprises a flame-retardant aromatic polyester copolymer having a halogen content of 0.5 to 30 wt. % which is produced by a polycondensation reaction of:

(A) a mainly aromatic dicarboxylic acid or an ester-forming derivative thereof,
(B) a mainly aliphatic glycol or an ester-forming derivative thereof, and
(C) a halogenated ester-forming compound and 0.1 to 10 wt. %, based on the total composition, of an isocyanate compound.

12 Claims, No Drawings

HALOGENATED POLYESTER RESIN COMPOSITION AND ELECTRIC WIRE

The present invention relates to a coating material for electric wires. In particular, the present invention relates to a polyester resin composition comprising a halogenated, flame-retardant aromatic polyester copolymer and an isocyanate compound and having an excellent flame retardancy and a flexibility which does not suffer loss due to thermal history, and electric wires coated with this resin.

PRIOR ART

Rubber, polyvinyl chloride, polyethylene, polypropylene, nylon, etc., are usually used as the coating material for electric wires. Particularly polyvinyl chloride is recommended by virtue of its flame retardancy and mechanical strengths. As the circumstances under which these coating materials are used are becoming more and more severe, recently, further improvements in the properties such as heat resistance, electrical properties, flame retardancy, processability into thin-wall products in order to save the space, etc. are required of these materials.

Although fluororesin and crosslinked polyethylene satisfy these requirements, they cannot be easily processed into thin-wall products and, in addition, the fluororesin is expensive. Thus they are as yet unsatisfactory.

Although polyethylene terephthalate and polybutylene terephthalate attract attention by virtue of their excellent processability into thin-wall products, mechanical strengths (flexibility, abrasion resistance, etc.), thermal resistance and electrical properties, their flame retardancy is yet insufficient. Another defect of these polyalkylene terephthalates are that since they are crystalline resins, their flexibility is seriously impaired by thermal history including the heat treatment conducted after the coating and heating during use and, therefore, their mechanical strengths such as impact resistance are reduced. Thus the polyalkylene terephthalates cannot be used in the vicinity of a heat source or in an environment which is likely to cause heat buildup. The use of them are thus largely limited.

Processes for overcoming these defects have been proposed. They include, for example, a process which comprises adding an elastomer or an amorphous polymer in order to reduce the crystallinity to the extent possible and a process which comprises a partial crosslinkage in order to keep the stability of mechanical strengths.

Although the former process has some improvement effect, it has defects in that it cannot withstand long thermal history, since the crystalline resin matrix still remains therein and that the reduction in the content of the crystalline resin impairs the mechanical properties such as resistances to friction and abrasion.

Although the latter process has some effect for improving the stability of the mechanical properties by the crosslinking, it also has defects in that the flexibility of the product is sacrificed, in that the control of the process is complicated, since it includes the crosslinking reaction and in that the processability is seriously impaired.

SUMMARY OF THE INVENTION

Under these circumstances the present inventors have made intensive investigations for the purpose of producing a coating material for electric wires excellent in flame retardancy, mechanical properties and particularly electrical properties and having a flexibility which does not suffer loss due to thermal history, and have found that such a coating material can be produced by adding a specified compound to a halogenated flame-retardant aromatic copolyester. The present invention has been completed on the basis of this finding.

Thus the present invention relates to a halogenated polyester resin composition characterized by comprising a flame-retardant aromatic polyester copolymer having a halogen content of 0.5 to 30 wt. % which is produced by a polycondensation reaction of:
(A) a mainly aromatic dicarboxylic acid or an ester-forming derivative thereof,
(B) a mainly aliphatic glycol or an ester-forming derivative thereof, and
(C) a halogenated ester-forming compound and 0.1 to 10 wt. %, based on the total composition, of an isocyanate compound, and also an electric wire coated with the composition.

It is quite difficult to impart favorable properties which is required of the coating material for electric wires according to the present invention, such as flame retardancy, resistances to friction and abrasion, and flexibility (bending strength and high elongation), and at the same time to keep the initial high elongation and bending strength even in a heating atmosphere for a long time without causing loss of the flexibility due to thermal history. It is surprising that a combination of a halogenated copolyester with a predetermined amount of an isocyanate compound is capable of satisfying these requirements of the coating material for electric wires and that the addition of the isocyanate prevents the flexibility from suffering loss due to thermal history and remarkably increases the stability in a heating atmosphere for a long period of time.

Now the detailed description will be made on the polyester copolymer composition used in the present invention.

First, the description will be made on the constituents of the aromatic polyester copolymer which is the main component of the coating material of the present invention. The component (A) mainly comprises an aromatic dicarboxylic acid or an ester-forming derivative thereof. Typical examples of the component (A) include terephthalic acid and derivatives thereof. If necessary, the component (A) may also comprise auxiliary compounds such as dicarboxylic acid, e.g., isophthalic acid, naphthalenecarboxylic acid and naphthalenedicarboxylic acid as well as derivatives thereof fatty acids, e.g., adipic acid, sebacic acid, trimellitic acid and succinic acid as well as ester-forming derivatives thereof; and aromatic hydroxy carboxylic acids such as hydroxybenzoic acid and hydroxynaphthoic acid as well as ester-forming derivatives thereof.

The component (B) constituting the polyester copolymer of the present invention mainly comprises an aliphatic diol or an ester-forming derivative thereof. Typical examples of the component (B) include low-molecular weight glycols having 2 to 8 carbon atoms, such as diols, e.g., ethylene glycol, 1,4-butylene glycol, 1,3-propanediol, 1,4-butenediol, 1,6-hexanediol and 1,8-octanediol. The low-molecular weight glycol can be used in combination with a high-molecular weight glycol such as a polyalkylene oxide glycol, e.g., polyethylene oxide glycol or polybutylene oxide glycol. The addition of such a high-molecular weight glycol is quite effective in improving the elongation of the aromatic polyester used as the coating material for electric wires of the present invention and for imparting bending resistance thereto. If necessary, the component (B) may also comprise auxiliary compounds such as aromatic alcohols, e.g., bisphenol A, 4,4'-dihydroxybiphenyl and phosphinic acids having an aromatic diol group; alcohol/alkylene oxide adducts, e.g., bisphenol A/ethylene oxide (2 mol) adduct and bisphenol A/propylene oxide (2 mol) adduct; polyhydroxy compounds, e.g., glycerol and pentaerythritol; and ester-forming derivatives thererof.

The aromatic polyester copolymer of the present invention is produced by using a halogenated ester-forming compound as the monomeric component (C) to form the halogenated copolymer. The halogenated compounds usable for this purpose include, for example, the following compounds wherein the halogen is particularly preferably bromine:

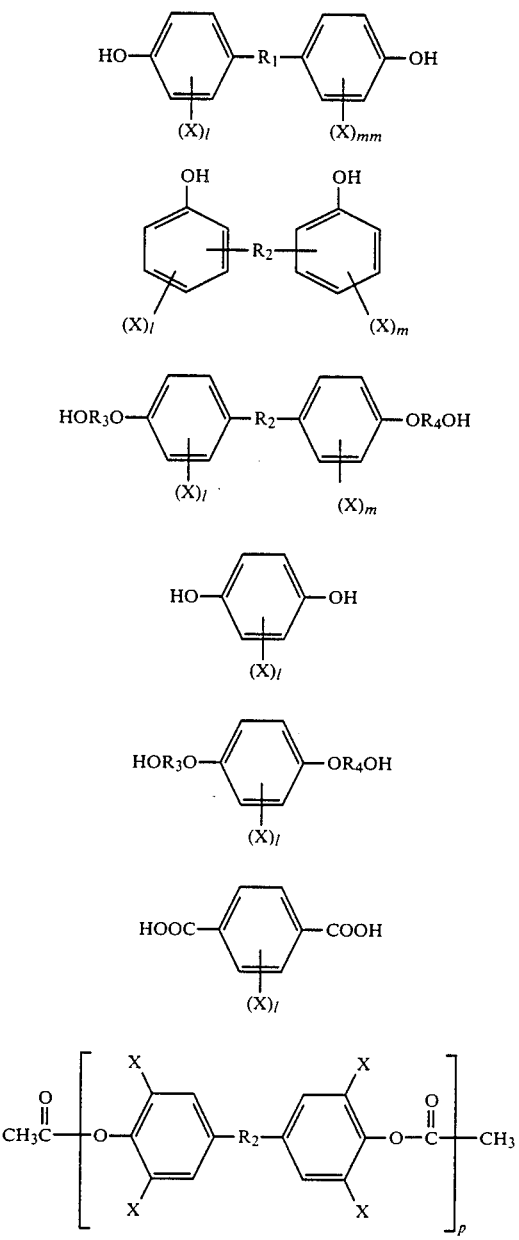

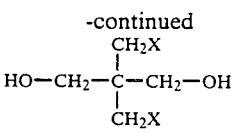

wherein $R_1$ and $R_2$ each represent $-CH_2-$,

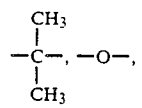

$-S-$ or $-SO_2-$,
$R_3$ and $R_4$ each represent $-C_2H_4-$, $-C_3H_6-$, $-(C_2H_4O)_p-$ or $-(C_3H_6O)_p-$,
X represents a halogen atom,
l and m each represent a number of 1 to 4, and
p represents an integer of at least 1.

The halogen compounds particularly suitable for use as the comonomer are those of the general formulae (1) to (7). Among these, compounds having at least 4 halogen atoms in the molecule are particularly preferred. When the halogen is bromine, the compounds of the general formula (1) include, for example, tetrabromobisphenol A and tetrabromobisphenol sulfone; those of the general formula (2) include, for example, tetrabromobisphenol F; those of the general formula (3) include, for example, tetrabromobisphenol A/ethylene oxide (2 mol) adduct, tetrabromobisphenol A/propylene oxide (2 mol) adduct, tetrabromobisphenol sulfone/ethylene oxide (2 mol) adduct and tetrabromobisphenol sulfone/propylene oxide (2 mol) adduct; those of the general formula (4) include, for example, tetrabromohydroquinone; those of the general formula (5) include, for example, tetrabromohydroquinone/ethylene oxide (2 mol) adduct; those of the general formula (6) include, for example, tetrabromoterephthalic acid; and those of the general formula (7) include, for example, tetrabromobisphenol A polycarbonate.

The halogenated monomeric compound usable as the comonomer has a molecular weight of preferably at least 390. When the molecular weight is insufficient, the oxygen index which is an index of the flame retardancy cannot be improved. The halogenated monomeric compound preferably has at least one aromatic ring in the molecule.

The halogenated compound is used in such an amount that the formed copolyester will have a halogen content of 0.5 to 30 wt. %, preferably 2 to 20 wt. %. When it is less than 0.5 wt. %, no sufficient flame retardancy can be obtained and, on the contrary, when it exceeds 30 wt. %, the mechanical properties are impaired unfavorably.

The relative amounts of the monomers used for the production of the polyester copolymer used in the present invention are as follows: when the ester-forming functional group of the halogen compound (C) is an alcoholic group, the total of the components (B) and (C) is 90 to 200 mol, preferably 95 to 150 mol, for 100 mol of the component (A). When the ester-forming functional group of the halogen compound (C) is a carboxylic acid group, 90 to 200 mol, preferably 95 to 150 mol, of component (B) is used for 100 mol of the total of components (A) and (C).

When the coating material having a high oxygen index is required under the conditions of its use, the halogen content of the copolymer is controlled by suitably controlling the amount of the component (C) in order to obtain the intended oxygen index.

The copolymer used in the present invention can be produced by any known polymerization process such as melt polymerization, interfacial polymerization or solid phase polymerization. The copolymer having an intrinsic viscosity of about 0.5 to 3.0 is usable.

The composition of the present invention is characterized in that it comprises the above-described halogenated polyester copolymer and a specified amount of an isocyanate compound which will be described below.

The isocyanate compounds are represented by the following general formula (a):

wherein R represents a divalent or higher valent organic group and n represents an integer of 2 to 4.

R in the formula (a) is one or more groups selected from the group consisting of aliphatic hydrocarbon groups having 1 to 30 carbon atoms, aromatic hydrocarbon groups having 6 to 30 carbon atoms and alicyclic hydrocarbon groups having 1 to 30 carbon atoms and 0 to 6 oxygen atoms.

When n in the above general formula (a) is 2, the isocyanate compounds are, for example, toluene diisocyanate, methylenediphenyl diisocyanate, xylylene diisocyanate, naphthalene diisocyanate, 3,3'-dimethyldiphenyl 4,4'-diisocyanate, hexamethylene diisocyanate, isophorone diisocyanate, hydrogenated methylenediphenyl diisocynate, hydrogenated toluene diisocyanate, lysine diisocyanate, bis(2-isocyanatoethyl) fumarate and dimer acid diisocyanates.

When n in the above general formula (a) is 3 or above, the isocyanate compounds are those of the following formulae:

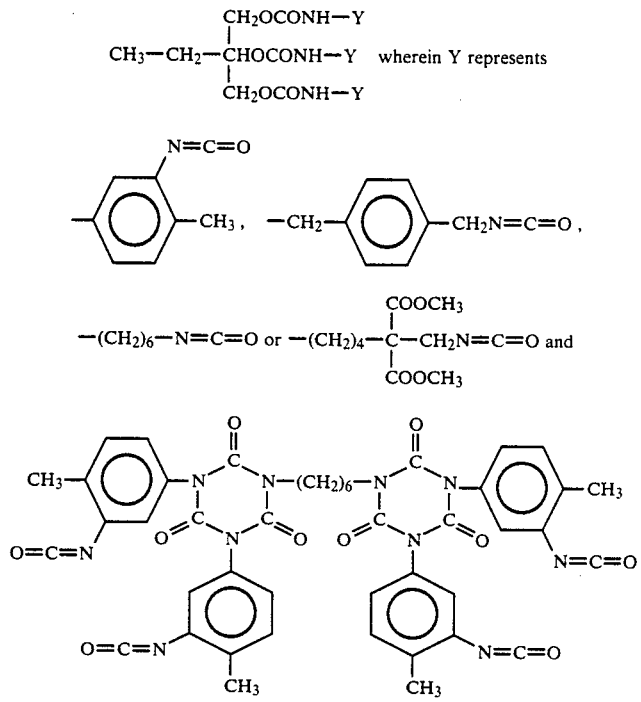

When n is 2, the diisocyanates can be trimerized to form trimers which are also usable.

The amount of the isocyanate compound added is 0.1 to 10 wt. %, preferably 0.1 to 5 wt. %, based on the total composition. When it is insufficient, no intended effect can be exhibited and, on the contrary, when it is excessive, troubles such as an extreme increase of the viscosity and an increase of the decomposition products occur.

The isocyanate compound may be added in the step of producing the aromatic copolyester or, alternatively, in the step of producing the pellets.

Although the composition used in the present invention has an excellent performance without any additives, it is also possible to add additives for further improving the performance, if necessary. The additives include, for example, stabilizers such as antioxidants and ultraviolet absorbers, antistatics, flame retardants, flame-retarding assistants, colorants, e.g., dyes and pigments, lubricants for improving the fluidity and releasability, crystallization accelerators (nucleating agents) and inorganic materials. In particular, when the antioxidant is used in combination with the isocyanate compounds, the improving effect can be further increased.

The stabilizers usable herein include hindered phenols, amines and phosphorus compounds.

Examples of the hindered phenols include 2,2'-methylenebis(4-methyl-6-t-butylphenol), hexamethylene glycol bis(3,5-di-t-butyl-4-hydroxyhydrocinnamate), tetrakis[methylene(3,5-di-t-butyl-4-hydroxyhydrocinnamate)]methane, triethylene glycol bis-3-(3-t-butyl-4-hydroxy-5-methylphenyl)propionate, 1,3,5-trimethyl-2,4,6-tris(3,5-di-t-butyl-4-hydroxybenzyl)benzene, n-octadecyl 3-(4'-hydroxy-3',5'-di-t-butylphenol)-propionate, 4,4'-methylenebis(2,6-di-t-butylphenol), 4,4'-butylidenebis(6-t-butyl-3-methylphenol), 2,2'-thiodiethyl bis[3-(3,5-di-t-butyl-4-hydroxyphenyl) propionate, distearyl 3,5-di-t-butyl-4-hydroxybenzylphosphonate and 2-t-butyl-6-(3-t-butyl-5-methyl-2-hydroxybenzyl)-4-methylphenyl acrylate. They can be used either solely or in combination of two or more of them. Among these, particularly preferred are hexamethylene glycol bis(3,5-di-t-butyl-4-hydroxyhydrocinnamate), tetrakis[methylene(3,5-di-t-butyl-4-hydroxyhydrocinnamate)]methane and triethylene glycol bis-3-(3-t-butyl-4-hydroxy-5-methylphenyl)propionate.

Examples of the amine compounds include N-phenyl-N'-isopropyl-p-phenylenediamine, N,N'-diphenyl-p-phenylenediamine, 4,4'-bis(4-α,α-dimethylbenzyl)diphenylamine, diphenylamine/acetone condensate, N-phenylnaphthylamine and N,N'-di-β-naphthylphenylenediamine.

Examples of the phosphorus compounds include phosphonite compounds of the following general formula (9):

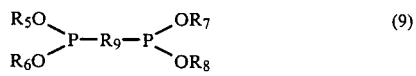
(9)

wherein $R_5$, $R_6$, $R_7$ and $R_8$ may be the same or different from one another and each represents an alkyl group having 1 to 25 carbon atoms, a substituted alkyl group, an aryl group or a substituted aryl group, such as a methyl, ethyl, butyl, octyl, decyl, lauryl, tridecyl, stearyl, phenyl, alkyl- and/or alkoxy-substituted phenyl group; and $R_9$ represents an alkylene group having 4 to 33 carbon atoms, a substituted alkylene group, an arylene group or a substituted arylene group, such as a butylene, octylene, phenylene, naphthylene or diphenylene group or a group of the following formula:

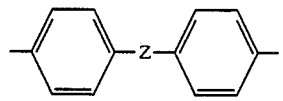

in which Z represents an oxy, sulfonyl, carbonyl, methylene, ethylidene, butylidene, isopropylene or diazo group.

A particularly preferred phosphonite compound is tetrakis(2,4-di-t-butylphenyl) 4,4'-diphenylenephosphonite.

The amount of the stabilizer is 0.01 to 5 wt. %, preferably 0.1 to 3 wt. %, based on the total composition.

The flame-retarding assistants usable herein include, for example, antimony compounds such as antimony trioxide and antimony halides; metal compounds containing zinc or bismuth; magnesium hydroxide and clayey silicates such as asbestos.

The inorganic materials include, for example, the usual inorganic fibers such as glass fibers, ceramic fibers, boron fibers, potassium titanate fibers and asbestos; and powdery or granular substances, platy inorganic compounds and whiskers such as calcium carbonate, highly dispersible silicates, alumina, aluminum hydroxide, talc, clay, mica, glass flakes, glass powder, glass beads, quartz powder, siliceous sand, wollastonite, carbon black, barium sulfate, calcined gypsum, silicon carbide, alumina, boron nitrite and silicon nitride.

These inorganic fillers can be used either singly or in combination of two or more.

One or more auxiliary organic polymeric substances can be mixed in the composition in order to further improve the melt extrusion and coating properties, lubricity and flexibility. Examples of these include other polyesters, polyamides, polyolefins and copolymers low molecular-weight polyethylene, polycarbonate, polyurethane, butyl rubber, polyphase copolymers comprising ABS resin and thermoplastic segment-type copolyesters, wherein the copolymers include graft copolymers.

The electric wire of the present invention is produced by a known process. Usually, the coating material is melt-extruded to coat a traveling conductor. The direction in which the conductor is traveling and the direction of extrusion of the coating material are on the same line or, alternatively, a crosshead having a predetermined angle is used. The electric wire of the present invention can be produced by either process.

The extruder is preferably a screw extruder capable of easily controlling the flow rate of the coating material.

The unevenness of the thickness of the coating material can be detected by a known method using, e.g., an X-ray or ultrasonic wave.

The degree of the eccentricity due to the uneven thickness of the coating material is represented by a concentricity $e_c$. The higher the value of $e_c$, the better. The $e_c$ is preferably at least 65%, particularly at least 70%.

$$e_c = \frac{e_{min}}{e_{max}} \times 100$$

wherein $e_{min}$ represents the minimum thickness of the section of the coating material and
$e_{max}$ represents the maximum thickness of the section thereof.

The nonuniformity of the section is detected with a nonuniformity detecting device and the clearance between the die and the conductor is adjusted at the die center of the screw extruder automatically or manually or, alternatively, the flow rate of the coating material is controlled depending on the pressure and the temperature.

It is also effective for reducing the nonuniformity to use a noneccentric head as the die.

In the production of the electric wire, the conductor is coated with the coating material and shaped and, if necessary, it can be passed through a heating zone in order to further improve the mechanical strengths of the coating material. The temperature of the heating zone is not higher than the melting point of the coating material and not lower than the glass transition temperature thereof.

Since the halogenated resin composition of the present invention are remarkably improved in the resistance of the physical properties to the thermal history as compared with those of ordinary polyester coating materials, the composition has the following excellent effects:

(1) the halogenated resin composition is effectively usable for coating electric wires to be used in the vicinity of heat sources, engines of transportation means and heat-generating parts of electric appliances, since the coating material has a high flame retardancy, the physical properties thereof suffer less loss due to the thermal history.

(2) The effective utilization of a limited space can be remarkably promoted, since a thin coating film can be produced from the coating material without impairing its mechanical and electrical properties and it has a high flexibility. The coating material is suitable particularly for coating electric wires of transportation means having a large density of information storage and only a limited space, such as space rockets, aircrafts and automobiles, electric appliances, computers and information processing devices.

(3) Since the halogenated compound is incorporated in the copolymer, the coating material of the present invention is free from bleeding even at a high temperature; which is often observed when a flame retardant is added. Therefore, the product has an excellent appearance and the blocking of electric wires with each other in the manufacturing step is inhibited to reduce the coating cost.

The coating material produced by the present invention is usable for coating electric wires in the fields of transportation means, electric, electronic or information devices and machines in addition to the above-described uses, since it has the above-described characteristic features. Further the coating material of the present invention is preferably used as a material for various appliances and parts of which such physical

EXAMPLES

The following Examples will further illustrate the present invention. Copolymers P, Q and R used in the Examples are those produced as described below.

PRODUCTION EXAMPLE 1 (production of copolymer P)

970 parts by weight of dimethyl terephthalate, 513 parts by weight of 1,4-butanediol, 158 parts by weight of tetrabromobisphenol A/ethylene oxide (2 mol) adduct and 0.7 part by weight of tetrabutoxytitanium were placed in a reactor provided with a stirrer, a nitrogen-inlet tube and a distillation tube and stirred in a nitrogen stream at 160° C. for 30 min. Then the temperature was slowly elevated and the stirring was continued under heating at 200° to 270° C. for 2 hrs. The introduction of nitrogen was stopped and the pressure in the reactor was slowly reduced so that the pressure would be 0.3 mmHg after 30 min. The stirring was continued under this pressure for 3 hrs. The polymer intrinsic viscosity of 1.0 and a bromine content of 6.5 wt. %.

PRODUCTION EXAMPLE 2 (PRODUCTION OF COPOLYMER Q)

970 parts by weight of dimethyl terephthalate, 513 parts by weight of 1,4-butanediol, 171 parts by weight of tetrabromobisphenolsulfone/propylene oxide (2 mol) adduct and 0.7 part by weight of tetrabutoxytitanium were placed in a reactor provided with a stirrer, a nitrogen-inlet tube and a distillation tube and stirred in a nitrogen stream at 160° C. for 30 min. Then the temperature was slowly elevated and the stirring was continued under heating at 200° to 270° C. for 2 hrs. The introduction of nitrogen was stopped and the pressure in the reactor was slowly reduced so that the pressure would be 0.3 mmHg after 30 min. The stirring was continued at 270° C. under this pressure for 3 hrs. The polymer thus formed had an intrinsic viscosity of 1.1 and a bromine content of 6.3 wt. %.

PRODUCTION EXAMPLE 3 (PRODUCTION OF copolymer R)

900 parts by weight of dimethyl terephthalate, 450 parts by weight of 1,4-butanediol, 50 parts by weight of polybutylene oxide glycol having an average molecular weight of 400, 158 parts by weight of tetrabromobisphenol A/ethylene oxide (2 mol) adduct and 0.7 parts by weight of tetrabutoxytitanium were placed in a reactor provided with a stirrer, a nitrogen-inlet tube and a distillation tube and stirred in a nitrogen stream at 180° C. for 30 min. Then the temperature was slowly elevated and the stirring was continued under heating at 200° to 270° C. for 3 hrs. The introduction of nitrogen was stopped and the present in the reactor was slowly reduced so that the pressure would be 0.5 mmHg after 15 min. The stirring was continued under this pressure for 6 hrs. The polymer thus formed had an intrinsic viscosity of 1.0 and a bromine content of 6.5 wt. %.

EXAMPLE 1

98.5 parts by weight of the copolymer P was powder-mixed with 1.5 parts by weight of methylenediphenyl diisocyanate (hereinafter referred to as MDI) and the mixture was homogeneously melt-kneaded and pelletized with an ordinary extruder. The formed pellets were molded into test pieces by a usual process with an injection molding machine. The physical properties of the test pieces were evaluated.

The physical properties were determined by the following processes: the tensile strength and the elongation (%) were determined according to ASTM D 638, which the dielectric breakdown and the dielectric constant were determined by a short time method of ASTM D 149 and DISO (1 kHz), respectively. In the flame retardancy test, the results were represented by "O" when it was extinguished in 30 sec and "X" when it was not extinguished in the same period according to UL-94 V. The oxygen index was determined according to JIS K 7201. The surface conditions after heating at 120° C. for 72 hr were examined and the results were represented by "X" when the bleeding, expansion, etc., were observed and "O" when no disorder was recognized.

The tensile test pieces were kept in a constant temperature bath at 120° C. for 500 hrs. and the elongation and the retention of the elongation of these were determined by the above-described method.

A compressed stranded copper conductor having a circular cross section and an outer diameter of about 1.9 mm was coated with the resin composition in a thickness of 0.3 mm to form an electric wire. It was then kept in a constant temperature bath at 120° C. for 500 hrs. and then folded at an angle of 90° ten times. The surface conditions of the samples were observed to determine the flexibility thereof. When a breakage or fine cracks were observed, the results were represented by "X" and when no change was observed, the results were represented by "O".

The results shown in Table 1.

EXAMPLE 2

98.5 parts by weight of the copolymer P was powder-mixed with 1.5 parts by weight of isophorone diisocyanate (IPDI) trimer and the mixture was homogeneously melt-kneaded and pelletized with a usual extruder. The resulting resin composition was evaluated in the same manner as that of Example 1. The results are shown in Table 1.

EXAMPLES 3 to 6

The same procedure as that of Examples 1 and 2 was repeated except that the copolymer Q was replaced with the copolymer R. The results are shown in Table 1.

EXAMPLES 7 to 9

1.0 part by weight of triethylene glycol bis[3-(3-t-butyl-5-methyl-4-hydroxyphenyl) propionate] (Irganox ® 245) was added as an antioxidant to 100 parts by weight of the resins of Examples 1, 3 and 5. The resin compositions thus obtained were evaluated in the same manner as that of Example 1. The results are shown in Table 1.

EXAMPLES 10 to 12

The same procedure as that of Example 1 was repeated except that the resin composition was altered as shown in Table 1. The results are shown in Table 1.

COMPARATIVE EXAMPLES 1 to 6

The same procedure as that of Example 1 was repeated except that no isocyanate compound was used and that the copolymer used and resin composition were altered as shown in Table 1. The results are shown in Table 1.

COMPARATIVE EXAMPLE 7

1.5 parts by weight of MDI was added to 98.5 parts by weight of polybutylene terephthalate and then the same procedure as that of Example 1 was repeated to form test pieces. The results of the evaluation are shown in Table 1.

COMPARATIVE EXAMPLE 8

1.5 parts by weight of MDI and 12.5 parts by weight of decabromodiphenyl ether were added to 86 parts by weight of polybutylene terephthalate and then the same procedure as that of Example 1 was repeated to form test pieces. The results of the evaluation are shown in Table 1.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Resin composition | Resin used (pts. by wt.) | P 98.5 | P 98.5 | Q 98.5 | Q 98.5 | R 98.5 | R 98.5 | P 98.5 | Q 98.5 | R 98.5 | P 99.7 | P 96 | P 90 |
| | Isocyanate compound MDI (pts. by wt.) | 1.5 | — | 1.5 | — | 1.5 | — | 1.5 | 1.5 | 1.5 | 0.3 | 4 | 10 |
| | IPDI trimer (pts. by wt.) | — | 1.5 | — | 1.5 | — | 1.5 | — | — | — | — | — | — |
| | Flame retardant (pts. by wt.) | — | — | — | — | — | — | — | — | — | — | — | — |
| | Stabilizer (pts. by wt.) | — | — | — | — | — | — | 1.0 | 1.0 | 1.0 | — | — | — |
| Dielectric breakdown (kV/mm) | | 17 | 17 | 17 | 17 | 17 | 17 | 17 | 17 | 17 | — | 17 | 17 |
| Dielectric constant | | 3.2 | 3.2 | 3.2 | 3.2 | 3.3 | 3.3 | 3.2 | 3.2 | 3.3 | 3.2 | 3.2 | 3.2 |
| Flame retardancy | | O | O | O | O | O | O | O | O | O | O | O | O |
| Oxygen index | | 27 | 27 | 27 | 27 | 27 | 27 | 27 | 27 | 27 | 27 | 27 | 27 |
| Surface condition | | O | O | O | O | O | O | O | O | O | O | O | O |
| Tensile strength (kg/cm$^2$) | | 568 | 575 | 578 | 576 | 545 | 548 | 566 | 570 | 538 | 566 | 570 | 572 |
| Elongation (%) | | 320 | 325 | 324 | 320 | 310 | 312 | 325 | 324 | 310 | 330 | 280 | 270 |
| After keeping at 120° C. for 500 h | Elongation (%) | 280 | 284 | 270 | 269 | 242 | 240 | 274 | 270 | 268 | 268 | 210 | 204 |
| | Retention of elongation (%) | 88 | 87 | 83 | 84 | 78 | 80 | 84 | 83 | 86 | 81 | 75 | 76 |
| | Flexibility | O | O | O | O | O | O | O | O | O | O | O | O |

| | | Comparative Example | | | | | | | |
|---|---|---|---|---|---|---|---|---|---|
| | | 1 | 2 | 3 | 4 | 5 | 6 | 7 | 8 |
| Resin composition | Resin used (pts. by wt.) | P 100 | Q 100 | R 100 | P 99 | Q 99 | R 99 | PBT 98.5 | PBT 86 |
| | Isocyanate compound MDI (pts. by wt.) | — | — | — | — | — | — | 1.5 | 1.5 |
| | IPDI trimer (pts. by wt.) | — | — | — | — | — | — | — | — |
| | Flame retardant (pts. by wt.) | — | — | — | — | — | — | — | 12.5 |
| | Stabilizer (pts. by wt.) | — | — | — | 1.0 | 1.0 | 1.0 | — | — |
| Dielectric breakdown (kV/mm) | | 17 | 17 | 17 | 17 | 17 | 17 | 14 | 14 |
| Dielectric constant | | 3.2 | 3.2 | 3.3 | 3.2 | 3.2 | 3.3 | 3.3 | 3.1 |
| Flame retardancy | | O | O | O | O | O | O | X | O |
| Oxygen index | | 27 | 27 | 27 | 27 | 27 | 27 | 22 | 27 |
| Surface condition | | O | O | O | O | O | O | O | X |
| Tensile strength (kg/cm$^2$) | | 543 | 550 | 450 | 543 | 550 | 451 | 580 | 530 |
| Elongation (%) | | 350 | 345 | 550 | 350 | 345 | 548 | 320 | 88 |
| After keeping at 120° C. for 500 h | Elongation (%) | 77 | 79 | 110 | 102 | 114 | 148 | 265 | 54 |
| | Retention of elongation (%) | 22 | 23 | 20 | 29 | 33 | 27 | 83 | 61 |
| | Flexibility | X | X | X | X | X | X | O | X |

We claim:

1. A halogenated polyester resin composition characterized by comprising a flame-retardant aromatic polyester copolymer having a halogen content of 0.5 to 30 wt. % which is produced by a polycondensation reaction of:
   (A) a mainly aromatic dicarboxylic acid or an ester-forming derivative thereof,
   (B) a mainly aliphatic glycol or an ester-forming derivative thereof, and
   (C) a halogenated ester-forming compound and 0.1 to 10 wt. %, based on the total composition, of an isocyanate compound.

2. A resin composition according to claim 1, wherein the halogen is bromine.

3. A resin composition according to claim 1 or 2, wherein the aliphatic glycol (B) is a low-molecular weight glycol having 2 to 8 carbon atoms.

4. A resin composition according to claim 1 or 2, wherein the aliphatic glycol (B) is a low-molecular molecular weight glycol having 2 to 8 carbon atoms or a polyalkylene oxide glycol having a molecular weight of 200 to 4,000.

5. A resin composition according to claim 4, wherein the low-molecular weight glycol having 2 to 8 carbon atoms is one or more of ethylene glycol, 1,4-butylene glycol and 1,4-butene glycol.

6. A resin composition according to claim 1 or 2, wherein the halogenated ester-forming compound (C) has at least 4 halogen atoms in the molecule.

7. A resin composition according to claim 1 or 2, wherein the isocyanate compound is represented by the following general formula (a):

$$R(N=C=O)_n \quad \text{(a)}$$

in which R represents a divalent or higher valent organic group and n represents an integer of 2 to 4.

8. A resin composition according to claim 7, wherein R in the general formula (a) for the isocyanate compound is at least one organic group selected from the group consisting of aliphatic hydrocarbon groups having 1 to 30 carbon atoms, aromatic hydrocarbon groups having 6 to 30 carbon atoms and alicyclic hydrocarbon groups having 1 to 30 carbon atoms and 0 to 6 oxygen atoms.

9. A resin composition according to claim 1 or 2, which further contains 0.1 to 3 wt. %, based on the total composition, of a stabilizer.

10. An electric wire characterized in that has a surface coated with a coating material which is a halogenated polyester resin composition comprising a flame-retardant aromatic polyester copolymer having a halogen content of 0.5 to 30 wt. % which is produced by a polycondensation reaction of:
 (A) a mainly aromatic dicarboxylic acid or an ester-forming derivative thereof,
 (B) a mainly aliphatic glycol or an ester-forming derivative thereof, and
 (C) a halogenated ester-forming compound and 0.1 to 10 wt. %, based on the total composition, of an isocyanate compound.

11. An electric wire according to claim 10, wherein the halogen is bromine.

12. An electric wire according to claim 10 or 11, which is a low-voltage electric wire.

* * * * *